2,758,651
SEALING RING EXTRACTOR

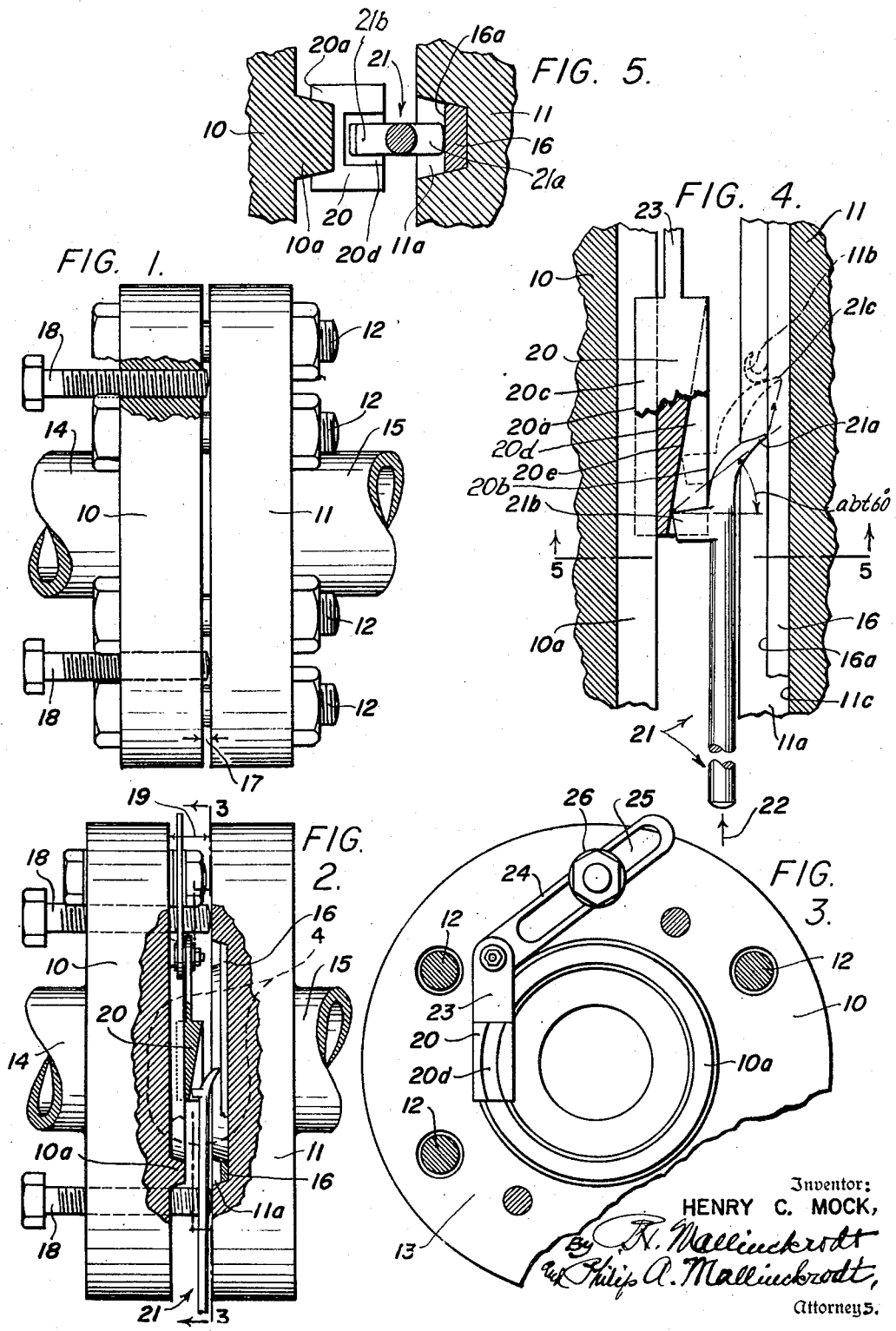

Henry C. Mock, Salt Lake City, Utah

Application May 11, 1953, Serial No. 356,693

6 Claims. (Cl. 164—73)

This invention relates largely to sealing ring extractors for high pressure pipe flanges, though not necessarily restricted thereto.

In modern industry, high pressure pipe lines for fluids such as steam, gas, water or oil are extensively used. The purpose of the flanges is to join consecutive lengths of pipe one to another. The flanges are usually bolted together in a manner that is well known, the flanges themselves being welded to the respective lengths of pipe.

In high pressure pipe work it is customary to connect the two flanges of a pair to each other by means of circular tongue and groove face joints. Each joint is provided with a sealing ring which normally rests in the bottom of the circular groove so as to be contacted by the corresponding mating tongue to form a tight seat.

For various reasons it becomes desirable from time to time to open a high pressure pipe joint, which necessarily breaks the seal, so that before the joint can again be used the old sealing ring must be removed entirely so as to leave a clean groove. Since a sealing ring after use is tightly wedged in a groove, it becomes difficult to remove the old ring by tools ordinarily available since the mating flanges can be separated from each other by only a small distance, for example, three-quarters of an inch.

A principal object of the invention is to provide a tool by means of which the removal of a used sealing ring from a flange joint is greatly facilitated, while the pipe assembly remains approximately in its installed position.

A further object is to accomplish the removal of a used sealing ring without in any way injuring either of the flange facings.

In the accompanying drawing, which illustrates an excellent embodiment of the present invention:

Fig. 1 represents a side elevation of an exemplary high pressure flange joint from which the sealing ring, not visible from the outside, is to be removed;

Fig. 2, a side elevation corresponding to Fig. 1, but showing the two flanges separated from each other and further showing certain portions broken away to reveal, in longitudinal section, the interior details of the joint, as well as showing the tool of the invention in operative position;

Fig. 3, a face elevation of one flange viewed from the line 3—3 in Fig. 2;

Fig. 4, an enlargement of substantially the portion enclosed by the broken line 4 in Fig. 2;

Fig. 5, a section taken along the line 5—5 in Fig. 4.

Referring to the drawing, the numeral 10 indicates a pipe flange having in this instance a tongue face, while the numeral 11 indicates the mating flange having a face provided with a groove adapted to receive the tongue. The two flanges normally are tightly drawn together by means of the usual bolts 12 arranged along the usual bolt circle 13. The flanges 10 and 11 are welded to respectively the pipes 14 and 15. The tongue 10a of the flange 10 preferably has tapering sides and a depth somewhat greater than the depth of the groove 11a in the flange 11. In the bottom of the groove 11a is a sealing ring 16 against which the tongue 10a bears when the flange bolts 12 are screwed up to draw the flanges together. When the tongue is finally seated against the sealing ring, there remains a slight opening indicated at 17 which insures the sealing seat 16a to be firmly contacted by the tongue at every point.

Assuming that the flange joint of Fig. 1 is to be opened and the sealing ring removed, the procedure is as follows:

First of all it is necessary to separate the flanges 10 and 11 sufficiently so that the tool of the invention can be inserted between the flanges. The separation of the flanges is accomplished by the usual cap screws 18 provided for this purpose. The two screws 18 are diametrically opposite each other and threaded for example in the flange 10. By turning the screws 18 in the proper direction, the screws become effective to push the two flanges apart from each other to a point indicated for illustration in Fig. 2, thus leaving the open space 19 between the faces of the two flanges.

The tool of the invention comprises, first, a guide block 20 which will presently be described in detail, and, secondly, a separate knife 21.

The two faces, 20a and 20b, of the guide block are arcuately grooved as at 20c and 20d to correspond respectively to the mating tongue and groove. The groove 20c is of uniform depth and rides on the tongue 10a, while the depth of the groove 20d varies uniformly from one end to the other of the guide block, thus inclining the bottom surface of the groove as clearly indicated at 20e in Fig. 4.

The knife 21 has an elongate shank or leg portion advantageously serving as a handle and terminating in a laterally directed toe member at one end of the knife, whose terminus is sharpened as a cutting edge 21a. A heel member or lug 21b extends oppositely from the toe member, advantageously at a location back along the shank of the knife from such toe member, so as to serve as a fulcrum against the inclined bottom surface of groove 20e of the guide block during use of the tool.

The width of the heel member or lug 21b of knife 21 is slightly less than the width of the groove 20d, with the result that the knife, when lightly tapped in the direction of the arrow 22, is caused to move arcuately along groove 20d without in the least harming any parts of the two flanges, but at the same time causing the cutting end or edge 21a of the toe member of the knife to cut into the exposed seating surface 16a of the sealing ring 16 within groove 11a.

In traveling along the surface or seat 16a, the edge 21a of the knife 21 is caused to cut thereinto, for the reason that the heel 21b is forced toward the sealing ring because of sliding along the inclined plane 20e at the bottom of the groove 20d. The cutting edge of the knife in moving from the position 21a to the position 21c will have made an incision in the surface of the sealing ring 16 and thereby loosened a shaving or curl 11b. In many instances it is possible for a workman to grasp the shaving 11b by means of other tools such as pliers and screwdrivers and thereby tear the sealing ring 16 apart. At other times it may be desirable to continue the tapping on the stem of the knife 21 and form a longer shaving (not shown) until finally the cutting end of the knife cuts entirely through the sealing ring 16 and contacts the bottom 11c of the groove 11a. In moving from the point 21a to the point 21c, the line of travel of the knife makes preferably an angle of approximately 60°. After the knife edge 21a strikes the bottom of the groove 11a, further tapping at 22 causes the knife to gradually force the sealing ring 16 out of the groove.

In order to hold the guide block 20 securely in place during its use, it is provided with a stem or arm 23 which, in turn, is pivotally fastened to a separable arm 24 having the slot 25 for engagement with any of the bolts 12. The arm 24 is held in place by the nut 26 of the corresponding bolt.

Various convenient ways of using the tool are:

(1) Removing the sealing ring from a flange joint while the joint is left in place. First, the joint is opened and the guide placed over the tongue portion of the joint and made secure by means of the arm 24 and nut 26. Next, the knife is placed in the guide and an incision made at the proper angle in the sealing ring, the location of the incision being conveniently marked on the edge of the flange. After removing the guide, the knife edge is put back into the incision and the opposite end of the knife tapped lightly with a hammer. Successive tapping of the knife will cause the cutting edge to slide along the bottom of the groove, while the sealing ring will be curled out of the groove.

(2) The guide is secured on the tongue face. The knife is inserted in the guide at a point half or two-thirds from the deep end of the groove. After making the initial incision, the knife is removed and the flanges brought together to approximately one-quarter of an inch, by means of the flange bolts. After making the final cut as in (1), a hooked tool can be used to get under end of ring and pull the end past the face of the groove flange, after which a flat blade can be inserted between flange face and ring to pry ring free of its seat around the circumference thereof.

(3) Cutting the sealing ring into separate annular sections by means of engaging the slotted arm 24 consecutively with the respective flange bolts 12.

Since high pressure flanges are usually made of tempered steel, it is desirable to make the knife 22 of mild steel so the knife point when contacting a flange shall not injure the same.

What is claimed is:

1. A sealing ring extractor for mating pipe flanges having tongue and groove facings, comprising a guide block having an arcuate channel formed on one side thereof and adapted to engage the tongue facing of one of said pipe flanges, and having an arcuate channel with longitudinally inclined bottom surface formed on the opposite side thereof, the inclined bottom channel being adapted to engage and guide a cutting tool operative in the groove of the mating pipe flange; and means for securing the guide block in registry with the said tongue facing of the first-mentioned pipe flange.

2. A sealing ring extractor in accordance with claim 1, wherein said pipe flanges are provided with flange bolts; wherein said means for operatively holding said guide block in registry with said tongue comprises a slotted arm engageable by one of the flange bolts, and an auxiliary arm pivotally connected to said slotted arm and extending from said pivotal connection to connection with said guide block.

3. A sealing ring extractor in accordance with claim 1, wherein the first-mentioned arcuate channel corresponds in curvature with said tongue facing and has substantially uniform depth, and the other arcuate channel corresponds in curvature with said groove facing and is inclined uniformly from one end to the other of said guide block.

4. A knife guide device for use in extracting a sealing ring embedded in the groove facing of a tongue and groove joint between the members of a pair of high pressure pipe flanges, comprising a guide block having one face thereof channeled to receive and move along the tongue of said joint, the said guide block, further, having a channel on the opposite face thereof, the second-mentioned channel being of uniformly varying depth from one end to the other longitudinally of said guide block.

5. A knife guide device in accordance with claim 4, wherein said guide block is provided with a stem extending longitudinally thereof and a slotted holder arm pivotably connected to said stem, said slotted holder arm being adapted for securement by means of a flange bolt located along the bolt circle of said high pressure flanges.

6. A sealing ring extractor in accordance with claim 1, wherein the means for operatively holding the guide block in registry with the tongue comprises a slotted arm, and means pivotally connecting said slotted arm to said guide block.

References Cited in the file of this patent
UNITED STATES PATENTS

| | | |
|---|---|---|
| 1,328,547 | Shaw | Jan. 20, 1920 |
| 2,075,520 | Hardesty | Mar. 30, 1937 |
| 2,235,342 | Turner | Mar. 18, 1941 |
| 2,303,851 | Lindroth | Dec. 1, 1942 |
| 2,471,557 | Bishop | May 31, 1949 |
| 2,607,376 | Montgomery | Aug. 19, 1952 |